US010755115B2

(12) United States Patent
Avidan et al.

(10) Patent No.: US 10,755,115 B2
(45) Date of Patent: Aug. 25, 2020

(54) METHOD, APPARATUS, AND SYSTEM FOR GENERATING SYNTHETIC IMAGE DATA FOR MACHINE LEARNING

(71) Applicant: HERE GLOBAL B.V., Eindhoven (NL)

(72) Inventors: Avi Avidan, Even Yehuda (IL); Evgeny Luk-Zilberman, Hertzlia (IL)

(73) Assignee: HERE Global B.V., Eindhoven (NL)

( * ) Notice: Subject to any disclaimer, the term of this patent is extended or adjusted under 35 U.S.C. 154(b) by 170 days.

(21) Appl. No.: 15/858,772

(22) Filed: Dec. 29, 2017

(65) Prior Publication Data

US 2019/0205667 A1 Jul. 4, 2019

(51) Int. Cl.
*G06K 9/00* (2006.01)
*G06K 9/62* (2006.01)
*G06N 20/00* (2019.01)
*G08G 1/16* (2006.01)

(52) U.S. Cl.
CPC ..... *G06K 9/00805* (2013.01); *G06K 9/00791* (2013.01); *G06K 9/6255* (2013.01); *G06K 9/6259* (2013.01); *G06N 20/00* (2019.01); *G08G 1/165* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 7,828,655 B2 | 11/2010 | Uhlir et al. | |
| 8,516,374 B2* | 8/2013 | Fleischman | G06Q 30/02 715/716 |
| 9,760,806 B1 | 9/2017 | Ning et al. | |
| 2010/0289632 A1 | 11/2010 | Seder et al. | |
| 2015/0186714 A1 | 7/2015 | Ren et al. | |
| 2016/0140400 A1 | 5/2016 | Chandraker et al. | |

(Continued)

OTHER PUBLICATIONS

Chiu et al., "Automatic Traffic Surveillance System for Vision-Based Vehicle Recognition and Tracking", Journal of Information Science and Engineering 26, 611-629 (2010)) (Year: 2010).*

(Continued)

*Primary Examiner* — Randolph I Chu
(74) *Attorney, Agent, or Firm* — Ditthavong & Steiner, P.C

(57) ABSTRACT

An approach is provided for generating synthetic image data for machine learning. The approach, for instance, involves determining, by a processor, a set of parameters for indicating an action by one or more objects. The action is a dynamic movement of the one or more objects through a geographic space over a period of time. The approach also involves processing the set of parameters to generate synthetic image data. The synthetic image data includes a computer-generated image sequence of the one or more objects performing the action in the geographic space over the period of time. The approach further involves automatically labeling the synthetic image data with at least one label representing the action, the set of parameters, or a combination thereof. The approach further involves providing the labeled synthetic image data for training or evaluating a machine learning model to detect the action.

19 Claims, 13 Drawing Sheets

(56) References Cited

U.S. PATENT DOCUMENTS

2017/0061625 A1 3/2017 Estrada et al.
2017/0236027 A1 8/2017 Van Der Made et al.

OTHER PUBLICATIONS

Krutak, "Multiple Vehicle Detection and Tracking from Surveillance Camera with Collision Prediction", Excel @ Fit 2016 (Year: 2016).*
Hamdan et al., "Traffic intensity monitoring using multiple object detection with traffic surveillance cameras", Proc. of the 4th IEEE International Conference on Smart Instrumentation, Measurement and Applications (ICSIMA) Nov. 28-30, 2017). (Year: 2017).*
Vishnu et al. "Road side video surveillance in traffic scenes using map-reduce framework for accident analysis.", Biomedical Research 2016; Special Issue: : S257-S266 (Year: 2016).*
Yao, "A Compact Driving Simulator to Support Research and Training Needs—Hardware, Software, and Assessment", Clemson University TigerPrints, 2015 (Year: 2015).*
Omnibond, "How TrafficVision Works", https://www.youtube.com/watch?v=gOIV0oZ9keo, 2014. (Year: 2014).*
Cheung et al., "LCrowdV: Generating Labeled Videos for Simulation-based Crowd Behavior Learning", (Year: 2016).*
Chen, Computer Vision and Machine Learning for Autonomous Vehicles, Worcester Polytechnic Institute, Aug. 2017 (Year: 2017).*
Fathollahi et al., "Autonomous driving challenge: To Infer the property of a dynamic object based on its motion pattern using recurrent neural network", Sep. 10, 2016, pp. 1-4.
Bhat, "DeepFollowing: Vision-Based Distance Estimation on Synthetically-Generated Driving Video using 3D Convolution", Princeton University, Operations Research and Financial Engineering, Senior Thesis, Jun. 2017, 68 pages.
Elahi et al., "Computer Vision Based Road Traffic Accident and Anomaly Detection in the Context of Bangladesh", 3rd International Conference on Informatics, Electronics & Vision 2014, 6 pages.
Haltakov et al., "Framework for generation of synthetic ground truth data for driver assistance applications", GCPR 2013, Lecture Notes in Computer Science, vol. 8142., pp. 1-10.
Gaidon et al., "Virtual Worlds as Proxy for Multi-Object Tracking Analysis", May 20, 2016, pp. 1-10.
Chen et al., "DeepDriving: Learning Affordance for Direct Perception in Autonomous Driving", Published in: Proceedings of the 2015 IEEE International Conference on Computer Vision, retrieved on Dec. 29, 2017 from http://deepdriving.cs.princeton.edu/paper.pdf, 9 pages.
Richter et al., "Playing for Data: Ground Truth from Computer Games", Aug. 7, 2016, retrieved on Dec. 29, 2017 from http://vladlen.info/papers/playing-for-data.pdf, pp. 1-16.
Notification of Transmittal of The International Search Report and The Written Opinion of The International Searching Authority, or The Declaration; International Search Report; and Written Opinion of the International Searching Authority for corresponding International Patent Application No. PCT/EP2018/097037, dated Mar. 4, 2019, 16 pages.
Abdi et al., "In-Vehicle Cooperative Driver Information Systems", Published in: 2017 13th International Wireless Communications and Mobile Computing Conference (IWCMC), Jun. 26, 2017, pp. 396-401.
Lee et al., "A study on the rear-end collision warning system by considering different perception-reaction time using multi-layer perceptron neural network", Published in: 2015 IEEE Intelligent Vehicles Symposium (IV), Jun. 28, 2019, pp. 24-30.

* cited by examiner

FIG. 4

SYNTHETIC IMAGE GENERATOR – PARAMETER INPUT

401

ACTION TO SIMULATE

☐ FAILING TO DRIVE AT A SAFE DISTANCE
☐ DRIVING ABOVE SPEED LIMIT
☐ FAILING TO YIELD
☐ RUNNING A RED LIGHT
☐ DRIVING IN THE WRONG DIRECTION
☐ DRUKEN DRIVER
☐ IMMINENT COLLISION
☐ 3RD PARTY ACCIDENT
☐ PEDESTRIAN CROSSING
☐ DANGEROUS OVERTAKING
☐ CUSTOM

OBJECTS INVOLVED

☐ VEHICLES
☐ PEDESTRIANS
☐ OTHER OBJECTS

GEOGRAPHIC PARAMETERS

☐ AREA OF INTEREST: _____
☐ ROUTE: _____
☐ ORIGIN-DESTINTATION PAIR: _____
☐ OTHER: _____

ENVIRONMENTAL PARAMETERS

☐ WEATHER: _____
☐ BACKGROUND: _____
☐ BACKGROND OBJECTS: _____

DATASET DELIVERY PARAMETERS

☐ PERSPECTIVE: _____
☐ FRAME SIZE/RATE: _____
☐ RESOLUTION: _____
☐ LENGTH: _____
☐ FORMAT: _____
☐ DELIVERY TYPE: _____

METHOD, APPARATUS, AND SYSTEM FOR GENERATING SYNTHETIC IMAGE DATA FOR MACHINE LEARNING

BACKGROUND

Over the past decades, massive increases in the scale and types of annotated data have accelerated advances in all areas of machine learning. This has enabled major advances is many areas of science and technology, as complex models of physical phenomena or user behavior, with millions or perhaps billions of parameters, can be fit to datasets of increasing size. However, when such physical phenomena or user behavior involves actions or dynamic movements (e.g., in automotive driving applications), such annotated or labeled datasets can be scarce. Accordingly, service providers face significant technical challenges obtaining labeled data to train machine learning models to detect or classify actions or dynamic movements from image data (e.g., videos or image sequences).

SOME EXAMPLE EMBODIMENTS

Therefore, there is a need for an approach for generating synthetic image data for machine learning.

According to one embodiment, a computer-implemented method comprises determining, by a processor, a set of parameters for indicating at least one action by one or more objects. The at least one action, for instance, is a dynamic movement of the one or more objects through a geographic space over a period of time. The method also comprises processing the set of parameters to generate synthetic image data. The synthetic image data includes a computer-generated image sequence of the one or more objects performing the at least one action in the geographic space over the period of time. The method further comprises automatically labeling the synthetic image data with at least one label representing the at least one action, the set of parameters, or a combination thereof. The method further comprises providing the labeled synthetic image data for training or evaluating a machine learning model to detect the at least one action.

According to another embodiment, an apparatus comprises at least one processor, and at least one memory including computer program code for one or more computer programs, the at least one memory and the computer program code configured to, with the at least one processor, cause, at least in part, the apparatus to determine a set of parameters for indicating at least one action by one or more objects. The at least one action, for instance, is a dynamic movement of the one or more objects through a geographic space over a period of time. The apparatus is also caused to process the set of parameters to generate synthetic image data. The synthetic image data includes a computer-generated image sequence of the one or more objects performing the at least one action in the geographic space over the period of time. The apparatus is further caused to automatically label the synthetic image data with at least one label representing the at least one action, the set of parameters, or a combination thereof. The apparatus is further caused to provide the labeled synthetic image data for training or evaluating a machine learning model to detect the at least one action.

According to another embodiment, a non-transitory computer-readable storage medium carries one or more sequences of one or more instructions which, when executed by one or more processors, cause, at least in part, an apparatus to determine a set of parameters for indicating at least one action by one or more objects. The at least one action, for instance, is a dynamic movement of the one or more objects through a geographic space over a period of time. The apparatus is also caused to process the set of parameters to generate synthetic image data. The synthetic image data includes a computer-generated image sequence of the one or more objects performing the at least one action in the geographic space over the period of time. The apparatus is further caused to automatically label the synthetic image data with at least one label representing the at least one action, the set of parameters, or a combination thereof. The apparatus is further caused to provide the labeled synthetic image data for training or evaluating a machine learning model to detect the at least one action.

According to another embodiment, an apparatus comprises means for determining, by a processor, a set of parameters for indicating at least one action by one or more objects. The at least one action, for instance, is a dynamic movement of the one or more objects through a geographic space over a period of time. The method also comprises processing the set of parameters to generate synthetic image data. The synthetic image data includes a computer-generated image sequence of the one or more objects performing the at least one action in the geographic space over the period of time. The method further comprises automatically labeling the synthetic image data with at least one label representing the at least one action, the set of parameters, or a combination thereof. The method further comprises providing the labeled synthetic image data for training or evaluating a machine learning model to detect the at least one action.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a diagram illustrating an example user interface for inputting parameters for generating synthetic image data, according to one embodiment;

DESCRIPTION OF SOME EMBODIMENTS

Examples of a method, apparatus, and computer program for generating synthetic image data for machine learning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
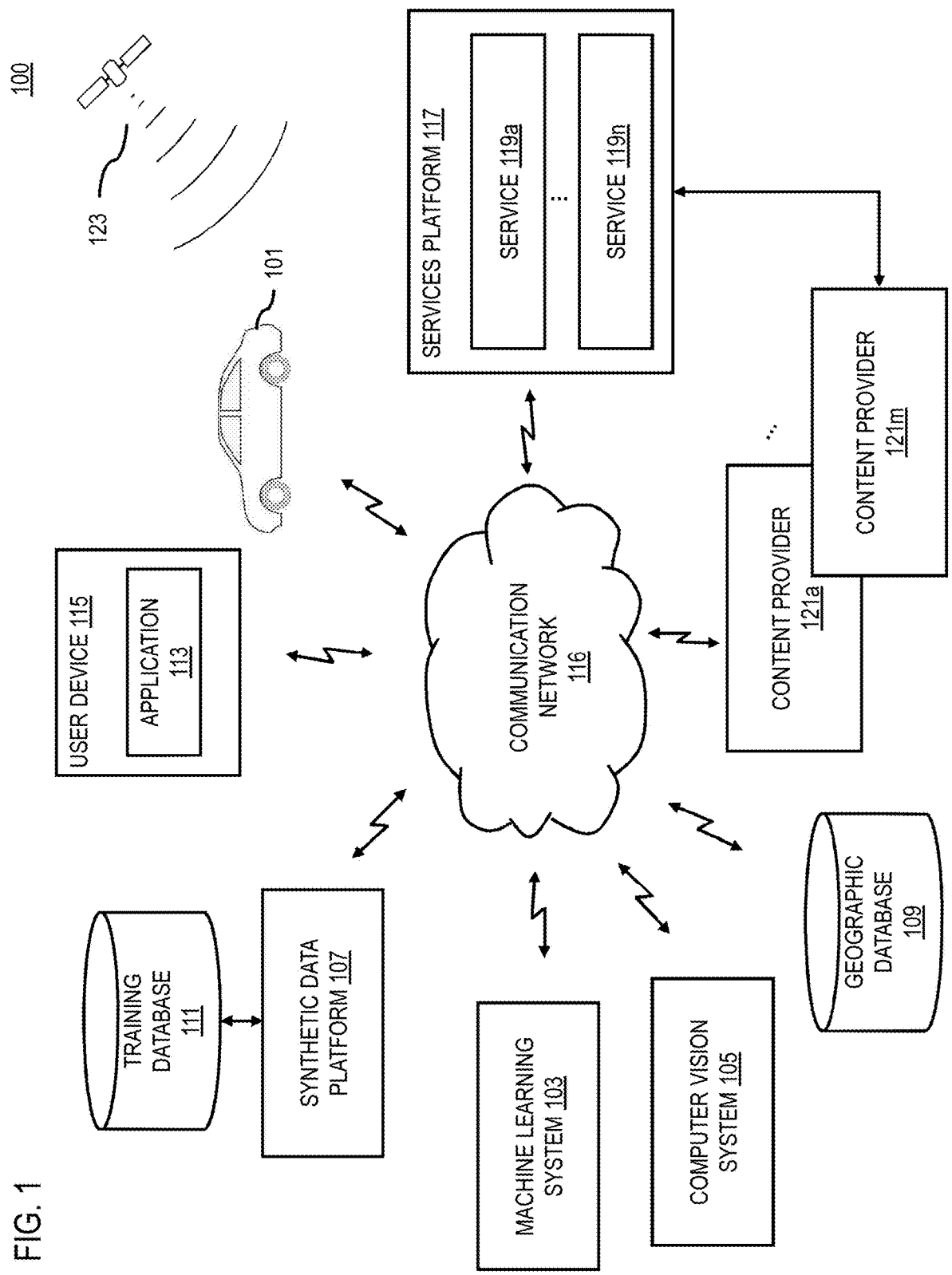
FIG. 1 is a diagram of a system capable of generating synthetic image data for machine learning, according to one embodiment.

FIG. 1 is a diagram of a system capable of generating synthetic image data for machine learning, according to one embodiment. Machine learning-based computer vision systems have enabled a variety of image recognition based services and applications. For example, in the automotive field, computer vision and machine learning have enabled real-time mapping and sensing of a vehicle's environment, particularly with respect to autonomous or semi-autonomous vehicles. Such an understanding of the environment provides increased safety and situational awareness while driving in a vehicle (e.g., a vehicle 101) by, for instance, providing information about potential obstacles, the behavior of others on the road, and safe, drivable areas. An understanding of where other cars are and what they might do is important for a vehicle 101 to safely operate. For example, vehicles 101 generally must avoid both static obstacles (e.g., guard rails, medians, signs, lamp posts, etc.) and dynamic obstacles (e.g., other vehicles, pedestrians, animals, road debris, etc.), and these obstacles are dynamic may move, change, and/or appear in real-time. The dynamic nature of the movements or actions present significant technical challenges for training and evaluating machine learning models (e.g., a machine learning system 103 in combination with a computer vision system 105) to detect the actions in image sequences or videos (e.g., as captured in real-time from camera-equipped vehicles 101).

One technique that has shown significant ability in image recognition is the use of convolutional neural networks (e.g., CNNs) or equivalent machine learning models/algorithms. For example, neural networks have shown unprecedented ability to recognize objects and actions in image data (e.g., individual images and/or image sequences/videos), understand the semantic meaning of image data, and classify the image data according to semantic categories. However, CNNs and other machine learning models often need significant amounts of labeled training evaluation datasets to achieve a target level of feature prediction performance. Obtaining such training and/or evaluation data with labeled ground truth examples of dynamic movements or actions can be challenging because actions generally cannot be adequately depicted in a single image. Instead, an image sequence of at least two image frames (or a video or video clip) are needed to provide examples of actions or dynamic movements that can be learned by a machine learning system 103.

For example, labeled datasets for training CNNs or equivalent in the automotive scenario (e.g., for achieving crash detection prediction) are relatively scarce. As used herein, a labeled dataset is image data (e.g., image sequences) that has been annotated with one or more labels that represent ground truth classes for the depicted action or dynamic movement. Traditionally, in the automotive scenario, real-world footage from accidents at given locations are often annotated (e.g., typically by a human) for used as labeled training or evaluation data for accident or collision detection. However, this real-world footage generally does not cover a large amount of possibilities of how an accident may occur on a single location, let alone in a variety of different locations. In addition, it can be rare or otherwise dangerous to obtain video footage of particularly dangerous situations (e.g., accidents between vehicles, accidents with pedestrians, dangerous vehicle maneuvers, etc.). This limited data can reduce the generalizability or prediction accuracy of the resulting machine learning model.

In addition, tagging/labeling video clips in a dataset as positive/negative for a characteristic, such as "dangerous driving behavior" requires a large manual effort. This manual effort can be slow and error prone because it relies on individual human annotators to review and label the video clips. Differences in perception and interpretation of movements or actions in the video clips by human annotators can then lead to potentially different or inconsistent labeling. Therefore, such datasets often involve a high production cost and are limited to the available videos.

For example, under traditional approaches, image or video training datasets are offered as file packages. These packages typically are constrained to images captured at a specific location that have been labeled (mostly) by hand to identify objects instead of the actions or movements of the objects as would be used to train a machine learning model to detect actions. A state of the art example is the KITTI training set (e.g., produced by the Kalsruhe Institute of Technology and Toyota Technological Institute at Chicago), which includes labeled imagery of real drives through Karlsruhe in Germany. The KITTI dataset, however, has shortcomings with respect to training to detect actions or movements such as when performing detection collision and other similar automotive applications. The shortcomings include providing only limited geographic coverage (e.g., Kalsruhe, Germany) which can potentially reduce generalizability of the trained machine learning model. In addition, labeling of the data has to be done by human review of the entire dataset. In addition, the dataset is static, and a new dataset requires new drives and new labelling effort.

To address these problems, a system 100 of FIG. 1 introduces a capability to generate synthetic image data (e.g., image sequences or videos) based on user defined parameters. In one embodiment, the parameters can describe the types of actions or movements that synthetic image data is to depict. The system can then use the parameters to automatically generate and label the synthetic image data. This labeled synthetic data can be then be used for training or evaluating machine learning models (e.g., CNNs or equivalent) to predict or detect actions or dynamic movements of objects in input image sequences or videos. The various embodiments of generating synthetic image data described herein provide advantages over traditional real-life video dataset because the real-life video datasets only encompass a finitie and limited number of locations and scenarios.

Generally, synthetic datasets of sufficient image quality perform similarly to real world imagery when used to train CNN detectors for detecting a specific situation, action, or movement. In one embodiment, a target image quality level can be achieved by modern graphics and simulation engines, such as driving simulators. Accordingly, in one embodiment, instead of providing a set of images gathered through cameras at a real-world location, the system 100 can provide a Synthetic Training Dataset Generation Service (e.g., via a synthetic data platform 107) to generate labeled synthetic image data tailored to user-defined parameters to represent various actions/movements, geographic locations, environmental conditions, object types, etc. By way of example, the user for such a service can include, but is not limited to: (1) a human user defining the dataset parameters over a user interface of an application/webpage/cloud service, etc.; or (2) a client application/device/system, providing the dataset parameters over an application programming interface (API).

In contrast to traditional systems, the system 100 (e.g., via the synthetic data platform 107) is able to generate a dataset with one or more labeled classes of actions or situations including a dynamic movement (rather than classes of objects which is the case with traditional systems). In other words, the system 100 generates a dataset of labeled traffic incident video clips or video clips labeled with any other action or situation involving dynamic movement for training a CNN detector (or any other equivalent machine learning algorithm). The dataset is synthetic, i.e., generated using any rendering and/or physics engine or method known in the art. By way of example, such engines include, but are not limited to, driving simulators, game engines, and/or the like. In one embodiment, the engines provide for simulating the physics of objects, rendering a video clip, collision detection, artificial intelligence (e.g., to simulate driving behavior, pedestrian behavior, animal behavior, etc.), and/or the like. Examples of game engines include, but are not limited to, the Unreal Engine, Unity Engine, etc. In one embodiment, the engines can generate the synthetic image datasets from user parameters at varying levels of detail from abstract representations (e.g., simple shapes) to photorealistic representations. It is noted, that the synthetic image data can be used for any stage of the machine learning pipeline from training to evaluation/validation.

In one embodiment, multiple road geometries and features can be randomly generated by varying a set of randomizable parameters. In yet another embodiment, the system 100 can automatically label the synthetic image data because the system 100 would know the actions or situations requested by the user based on the corresponding specified parameters. In addition, the system 100 can further label the synthetic dataset by using the rendering/physics engine to simulate and identify when the paths of the objects depicted in the synthetic image sequence will intercept or come close to intercepting, without having to render the actual collisions, near misses, or potential collisions. In other words, rendering of the 3D objects inside a 3D world specified by user parameters allows for generating video content, which can be used to train a CNN or equivalent machine learning model. In one embodiment, any action or situation involving a dynamic movement by one or more objects (e.g., vehicles, pedestrians, etc.) can also be simulated and automatically labeled in the same manner (e.g. dangerous driving behavior of cars nearby, potential dangerous trajectory of a pedestrian/vehicle nearby, etc.)

In one embodiment, the synthetic image data can be generic using generic geographic locations (e.g., not corresponding to real-world locations) or actual real-world locations. For example, when a CNN or equivalent machine learning model is trained using generic imaging, imagery specific to one route will not be considered by the detector to increase generalizability with respect to the detected action or movement. In some cases, this may raise the issue that geometries specific to one route cannot be assessed by the trained machine learning model to a target level of accuracy or specificity. Accordingly, in cases where specific routes or locations are to be considered, the CNN or equivalent machine learning model can be trained using a synthetic dataset generated based on the geometry and other map-stored characteristics of a specific road, route, or location. In this way, a vehicle 101 could have further, previously unavailable insights of e.g. safety hazards specific to a route.

The various embodiments of generating synthetic image data describe herein provides several advantages. For example, the achievable sample variety is many times higher than the available variety from traditional real-world video sources, thereby advantageously increasing the technical performance of the trained machine learning mode. In addition, the production cost of automatically tagging synthetic image data sets as positive/negative cases decreases substantially in comparison to traditional human or manual labeling. Further, the learning acquired from synthetic data only is transferable and relevant to detect events in real-life videos with high accuracy.

Figure 2:
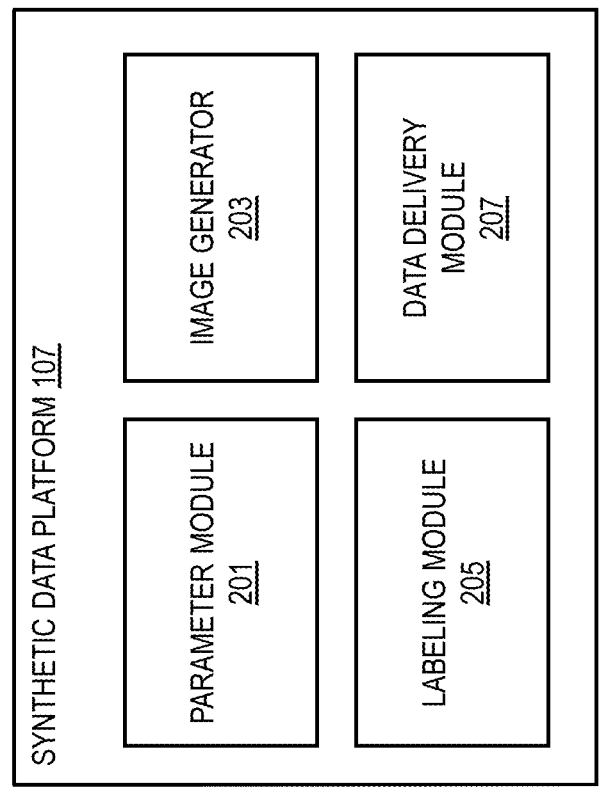
FIG. 2 is a diagram of the components of a synthetic data platform, according to one embodiment.

FIG. 2 is a diagram of the components of a synthetic data platform, according to one embodiment. By way of example, the synthetic data platform 107 includes one or more components for generating synthetic image data for machine learning according to the various embodiments described herein. It is contemplated that the functions of these components may be combined or performed by other components of equivalent functionality. In this embodiment, the synthetic data platform 107 includes a parameter module 201, an image generator 203, a labeling module 205, and a data delivery module 207. The above presented modules and components of the synthetic data platform 107 can be implemented in hardware, firmware, software, or a combination thereof. Though depicted as a separate entity in FIG. 1, it is contemplated that the synthetic data platform system 107 may be implemented as a module of any of the components of the system 100 (e.g., a component of the machine learning system 103, computer vision system 105, services platform 117, services 119a-119n (also collectively referred to as services 119), etc.). In another embodiment, one or more of the modules 201-207 may be implemented as a cloud based service, local service, native application, or combination thereof. The functions of the synthetic data platform 107 and the modules 201-207 are discussed with respect to FIGS. 3-9 below.

Figure 3:
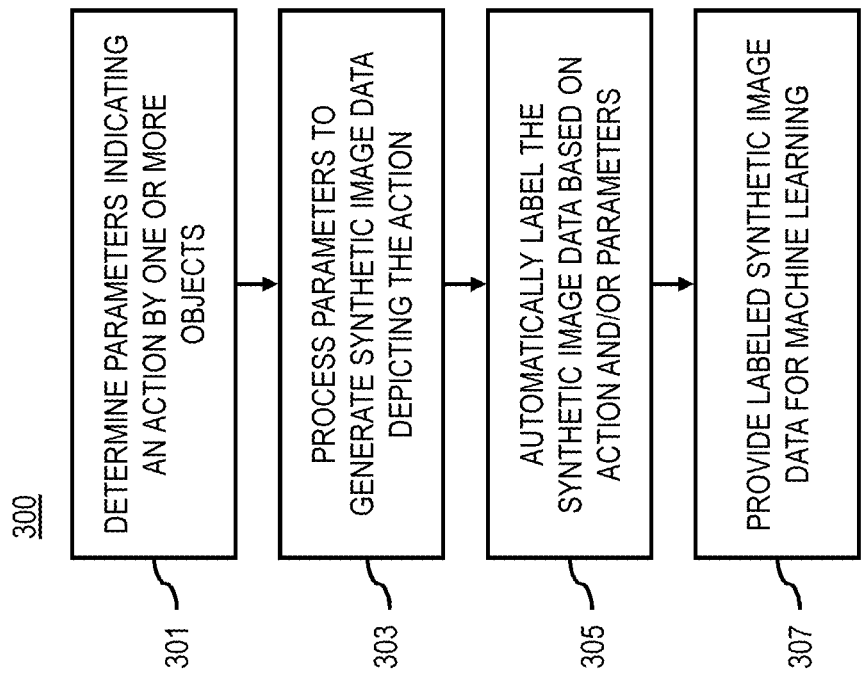
FIG. 3 is a flowchart of a process for generating synthetic image data for machine learning, according to one embodiment.
Figure 12:
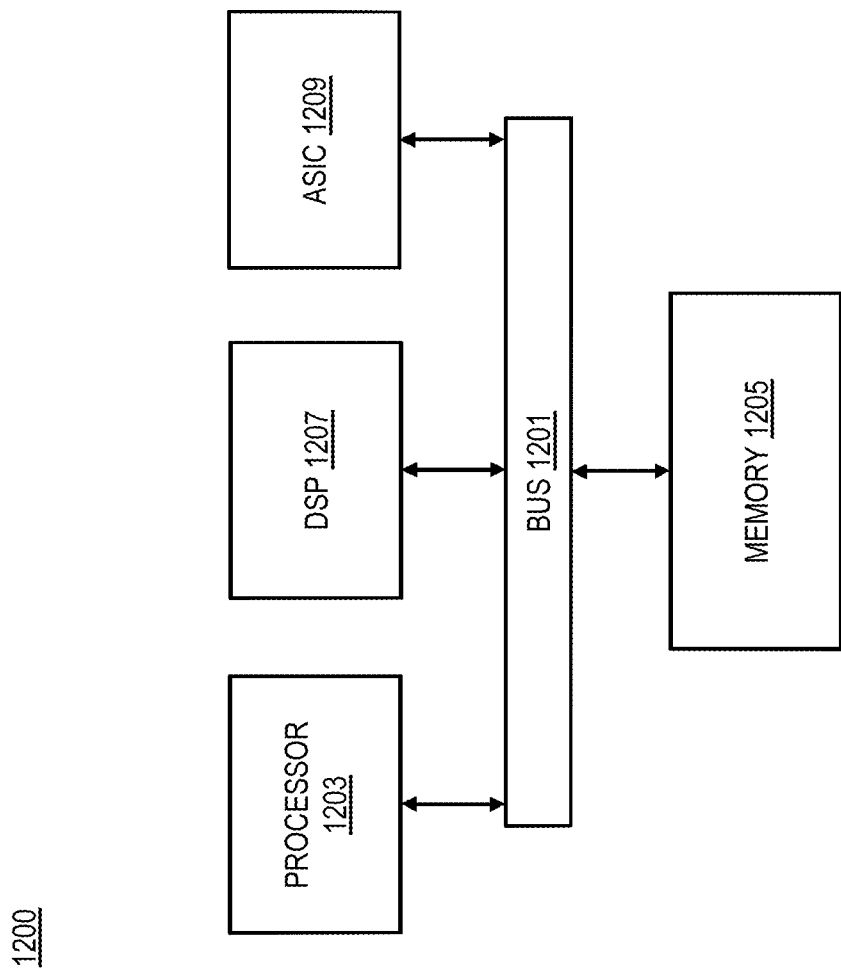
FIG. 12 is a diagram of a chip set that can be used to implement an embodiment of the invention.

FIG. 3 is a flowchart of a process for generating synthetic image data for machine learning, according to one embodiment. In various embodiments, the synthetic data platform 107 and/or any of the modules 201-207 of the synthetic data platform 107 may perform one or more portions of the process 300 and may be implemented in, for instance, a chip set including a processor and a memory as shown in FIG. 12. As such, the synthetic data platform 107 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

As discussed above, synthetic datasets perform similarly to real-world imagery when used to train CNN or equivalent machine learning detectors for detecting a specific action or situation including dynamic movements. Such synthetic image data can easily be achieved by modern simulation engines, such as driving simulators or game engines. As a result, instead of providing a set of images gathered through cameras at a real-world location, a user of the synthetic data platform 107 (e.g., supporting a Synthetic Training Dataset Generation Service) can provide the parameters for generating a desired synthetic image dataset. As previously discussed, the user can include, but is not limited to: (1) a human user defining the dataset parameters over a user interface of an application/webpage/cloud service, etc.; and/or (2) A client application/device/system, providing the dataset parameters over an API. For example, in step 301 of the process 300, the parameter module 201 determines a set of parameters (e.g., from a user) for indicating at least one action by one or more objects. FIG. 4 is a diagram illustrating an example user interface for inputting parameters for generating synthetic image data, according to one embodiment. As shown, the user interface 401 provides user interface elements for specifying the action to simulate, the objects involved, and other parameters such as environment geographic parameters, environmental parameters, and dataset delivery parameters. Examples of these parameters are discussed in more detail below.

In one embodiment, the at least one action is a dynamic movement of the one or more objects through a geographic space over a period of time. This is in contrast to traditional systems that generate classes of objects. Instead the embodiments of the synthetic data platform 107 described herein generate classes of actions which can then be used to automatically label the synthetic imaged data. In other words, the synthetic data platform 107 is able to generate a dataset with one or more labeled classes of actions. As noted above, an action or a situation can be defined by the dynamics of an object over time. In this way, actions can have various classes depending on how the action is defined. For example, when the action is a car movement, the resulting synthetic image data or dataset can include two classes: "car moving" versus "car standing still". As another example related to car movement, there can be an x number of classes corresponding to various speed ranges: 0-10 mph, 11-20 mph, 21-30 mph, and so on. Examples of other more complex actions can include, but are not limited: "Bicycle will collide with a pedestrian in t seconds", "dangerous bypassing of one car of another car", "car zig-zagging in its lane", etc. It is noted that the actions described herein are not generally recognizable in one image frame, but requires a sequence of two or more frames or images. This sequence of two or more images/frames is referred to herein as an image sequence. In the various embodiments described herein, this image sequence can also be referred to synonymously as a video or video clip.

In one embodiment, the at least one action can be related to an automotive scenario. As such, the one or more objects that are to perform the specified action or movement can include, but are not limited to, a vehicle, a pedestrian, a cyclist, an animal, a road, road debris, a road object, or a combination thereof. It is noted that the various embodiments described herein are also applicable to generating synthetic image data for any other use case in which a machine learning model is being trained to detect an action or movement (e.g., drone flight, human movement detection, non-vehicular movement detection, etc.). Accordingly, the specified object or action by the object can be related to another action or movement use case, and is not limited to the automotive use case.

In one embodiment, the parameter module 201 selects the geographic area based on an area of interest, an origin-destination pair, a navigation route, a road geometry, an accident rate, or a combination thereof. In other words, the user need not specify an exact geographic location to initiate the creation of the synthetic image data. Instead, the user can specify attributes (e.g., area of interest, origin-destination pair, route, road geometry, etc.) that can be used by the parameter module 201 to determine the appropriate geographic area. In one embodiment, the geographic area can be a real-world location or a generic location that is modeled to include the specified attributes. For example, in cases where real-world locations are used, the image generator 203 queries a geographic database for map data associated with the geographic area. The image generator 203 then renders the geographic area in the computer-generated image sequence based on the map data. The map data, for instance, can include HD surface maps of the terrain and/or locations of geographic features (e.g., roads, road objects, points of interest, etc.) that can be used to render a 3D rendering of the location in the synthetic image data.

In one embodiment, the set of parameters includes an action parameter describing a type of the at least one action. In an automotive scenario, the type of the at least one action includes failing to drive at a safe distance, driving above the speed limit, failing to yield, running a red light, driving in the wrong direction, driving while impaired, an imminent collision, an accident, a pedestrian or animal crossing or about to cross, safe or dangerous overtaking, dangerous driving behavior, or a combination thereof. The dataset should include labeled examples of these situations. Some situations not mentioned above may be entered in the system by defining object interactions as custom parameters. In other words, the user can specify another type of action other than the ones listed above using custom parameters.

In one embodiment, the general issue with datasets is that they usually only contain situations which have been foreseen and labeled. By generating the training sets on request, new scene objects and interactions can be defined. Taking the previous list as an example of pre-programmed situations, a traditional system generally would not be suited to generating labeled imagery of a cyclist performing a sudden and risky overtake because such footage would be rare or dangerous to obtain. Instead, a user could define the basic and generic pattern of such an overtake using, for instance, custom parameters if the action is not already preprogrammed into the synthetic data platform 107. For example, the user can specify the cyclist action to be based on the following:—a single lane road with a car driving slowly. The action can further specify parameters to indicate that the cyclist then accelerates to overtake the slowly driving car with less than 1 m sideways distance from car by straying into the opposite lane. In one embodiment, variations of such a scenario could be generated by the synthetic data platform 107 and automatically labeled accordingly, e.g., with on-coming traffic, at an intersection, vehicles ahead of the overtaken vehicle, etc. Variations of the situation would be labeled as positive as well.

A single video can also be an example of different simultaneous actions/situations, for which it can be labeled as positive for some situations and negative for other at the same time. The labeling could also include a relative figure (e.g. 85% chance of a collision) rather than a binary label.

In one embodiment, the set of parameters includes an object parameter describing a type of the one or more objects that are to be simulated to perform a specified action or movement in the synthetic image data. In an automotive scenario, example objects can include, but are not limited to vehicles, pedestrians, animals, road debris, other objects, etc. The object parameters can be further defined based on an initial high-level object type. Example object parameters can include, but are not limited to: (1) vehicle-related parameters; (2) pedestrian-related parameters; and (3) parameters related to other objects.

For example, vehicle-related parameters can be used to describe the types of vehicles as well as the physical and performance characteristics that can be used to determine their appearance, movement, behavior, etc. that is simulated for rendering in the computer-generated video or image sequence included in the synthetic image data. In one embodiment, the vehicle-related parameters can specify the type of vehicle such as, but not limited to: cars, trucks, bicycles, motorcycles, airplanes, aerial drones, boats, ships, trains, etc. Further defining vehicle-related parameters can specify: (1) different makes, models, colors, shapes, etc.; (2) different speeds and movement paths (legal and illegal) of the vehicles; and/or the like. In one embodiment, the vehicle-related parameters can be based on the selected geographic are or location. For example, the specific types of vehicles and/or their characteristics can be automatically determined based on the location. For example, urban centers can be rendered to include more passenger vehicles, taxis, smaller delivery trucks, while rural interstate highways can be populated with tractor-trailer trucks, long-haul vehicles, etc.

Similarly, pedestrian-related parameters can be used to describe the types, characteristics, behaviors, capabilities, etc. of pedestrians that are to be rendered in the synthetic image data as part of a selected action or movement to render. For example, these pedestrian-related parameters include, but are not limited to all person types (e.g., age, sex, size, ethnicity, with pets, etc. . . . ). In one embodiment, the pedestrian parameter values can also be derived according to the selected location. For example, demographic data can be retrieved for the selected geographic area from the geographic database 109 or other equivalent database. In this way, for instance, if the geographic area or location is a neighborhood street, more children can be selected as pedestrians to render. If the geographic location is a downtown urban location, then a pedestrian mix of mostly adults can be rendered. In addition, different pedestrian behaviors (e.g., walking, running, playing, erratic, etc.), appearance (e.g., clothing, accessories, on-person equipment, etc.), and/or the like may also be derived from location.

In addition to vehicles and pedestrians, parameters describing other objects to include in the synthetic image data can be specified. These other object parameters can indicate the types of objects as well as their behavior, appearance, and/or other characteristics. These other objects can include, but are not limited to: (1) animals (e.g., wild, domestic, etc.), (2) road debris, (3) road signs, (4) road objects (e.g., lane markings, guard rails, sidewalks, etc.), (5) nearby structures; (6) nearby terrain; and/or the like. In addition, the parameters can indicate characteristics such as, but not limited to, sizes, speeds, trajectories, etc. of the objects. The parameters can also specify whether the objects are involved in the selected action or movement (e.g., in the action path), involved in some side or secondary action occurring separately from the main selected action, presented as background objects, etc. In one embodiment, the other objects and/or their characteristics, behaviors, appearances, etc. may also be derived from the selected geographic location. For example, more wild animals (e.g., deer) can be rendered in computer-generated videos depicting rural roads.

In one embodiment, the set of parameters includes an environmental parameter describing the geographic space. Environmental parameters set the scene by specifying locations, general scene characteristics, visible background items, etc. For example, the locations can be specified using geographic parameters such as, but not limited to: Area of interest (defined by polygon, city, region, state, country ZIP-code); Origin-Destination pairs (to generate multiple possible routes); Specific routes (selected on basis of e.g. most traveled, statistically accident prone, etc.); Road geometry complexity (curves, bridges, tunnels, intersections, etc. may provide more interesting cases than straight roads); Accident rates; etc.

Other environmental parameters can include parameters related to weather/visibility conditions such as but not limited to: clear, cloudy, fog, rain, snow, hail, glare, darkness, etc. In one embodiment, environmental parameters can also include parameters for specifying presence/absence and/or other characteristics of background objects such as, but not limited to: advertisements, background people, animals, cloud formations, horizon features—which types, where, and how many.

In one embodiment, a synthetic image generator 203 can generate 3D scenarios in image sequences or videos by composing a renderable reality, in which actions can be simulated, for example, using available physics/rendering engines (e.g., driving simulators, game engines, etc.). Accordingly, in step 303, the image generator 203 processes the set of parameters to generate synthetic image data. The synthetic image data, for instance, includes a computer-generated image sequence of the one or more objects performing the at least one action in the geographic space over the period of time. In other words, situations or actions are simulated inside of the defined environments based on the user defined parameters indicating the action, objects, etc. to be simulated.

In one embodiment, the exact scene locations can be selected at random if no specific geographic area or location is specified by the user. In either case, if the geographic location is a real-world location, the synthetic image data can be constructed from actual 3D map data (with roads, buildings, roadside features, etc.). Objects derived from the object parameters would populate the scene and interact as defined by the action or situation (for generating labels) or in other patterns. Custom interactions would also be included in the synthetic image dataset. In one embodiment, the synthetic image generator 203 can create the computer-generated image sequence or video to include background imagery consistent with outdoor reality and the user defined parameters.

Figure 5:
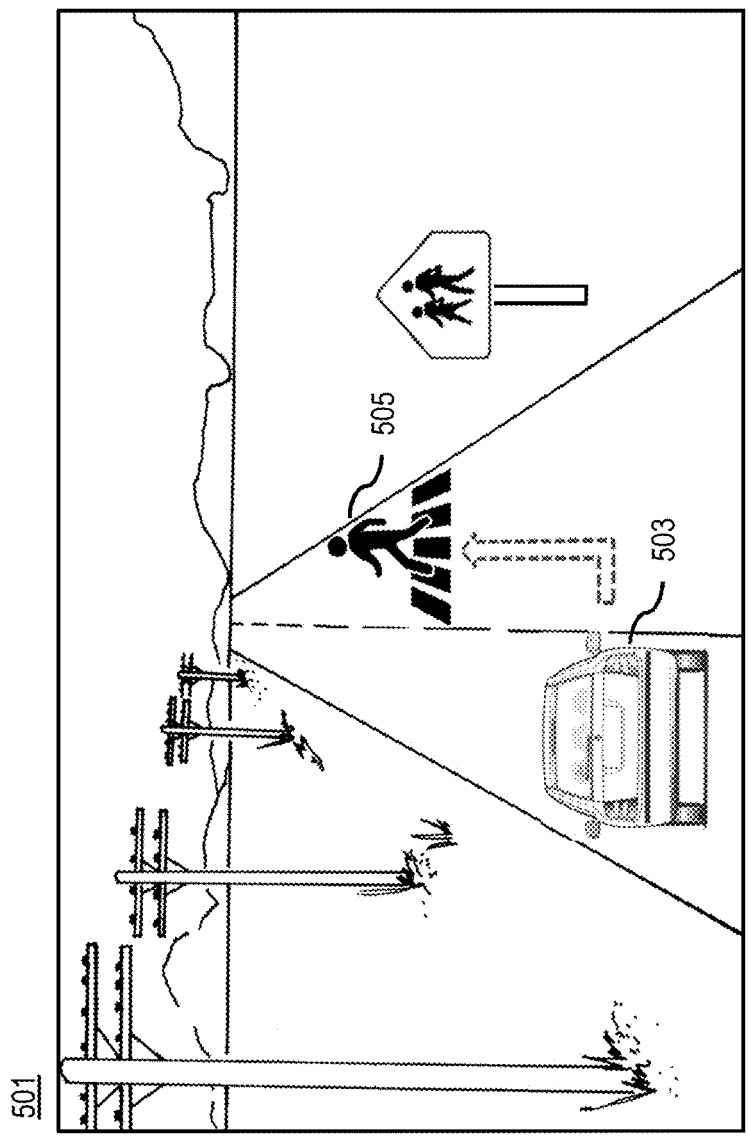
FIG. 5 is a diagram illustrating example synthetic image data, according to one embodiment.

FIG. 5 is a diagram illustrating example synthetic image data, according to one embodiment. More specifically, FIG. 5 illustrates an example video clip 501 in which a user has specified parameters describing a situation or action in which a vehicle 503 makes a dangerous left lane passing move in a school zone causing a potential collision with a pedestrian 505 within five seconds. The image generator 203 simulates the action and renders the video clip 501 that shows the dynamic movements involved in the dangerous overtaking and potential collision from the perspective of another vehicle traveling in the right lane that is being overtaken.

In one embodiment, the most basic version of background imagery can be a surface and a horizon (e.g., based on terrain topology corresponding to a selected location). Then the synthetic image generator 203 can render additional features such as a road topology occupying the surface. In one embodiment, the road topology can be produced from a set of basic geometries combined in endless permutations. In other embodiments, the road topology can be extracted from map databases, such as a geographic database 109 (e.g., with a high definition (HD) map data).

Depending on the user defined parameters, the 3D world generated by the synthetic image generator 203 can be complemented using random scenery objects such as buildings, trees, road furniture (signs, lights, etc.), parked vehicles, advertisement posters, etc. Such objects can also be obtained from a map containing 3D information, such as the geographic database 109. In addition, variable 3D moving objects (or designed to illustrate the action of interest), such as pedestrians, cyclists, vehicles, animals, debris can be generated to follow realistic (but still random) trajectories/scenarios in the scene using a pre-defined engine.

In one embodiment, the image generator 203 can distinguish between user-specified and randomizable parameters. For example, any of the parameters used by the synthetic data platform 107 can be classified as either user specified or randomizable. In one embodiment, any parameter that is not specified by a user can be selected as randomizable. As previously discussed, randomizing the values of certain parameters enable the machine learning system 103 be trained to be more generalizable with respect to a particular feature. If more specific prediction for a given feature is specified, then parameters or characteristics associated with the feature can be classified as not-randomizable (hence of limited or pre-defined variability). Accordingly, in one embodiment, the image generator 203 can determine one or more randomizable rendering variables associated with the computer-generated image sequence. The image generator then randomizes the one or more randomizable rendering variables to generate the synthetic image data. For example, in order to generate a viable dataset for machine learning (e.g., for CNNs), the video samples included in the synthetic image data may include random changes to several randomizable variables, such as, but not limited to: road shapes, road surfaces, road paint quality, road paint color, visibility/weather conditions, variable background, variable one/multiple lane trajectories for a road, variable one/multiple trajectories of objects (such as random pedestrian crossings, animals on the road, flying debris, rolling balls, etc.), and/or the like.

Figure 6:
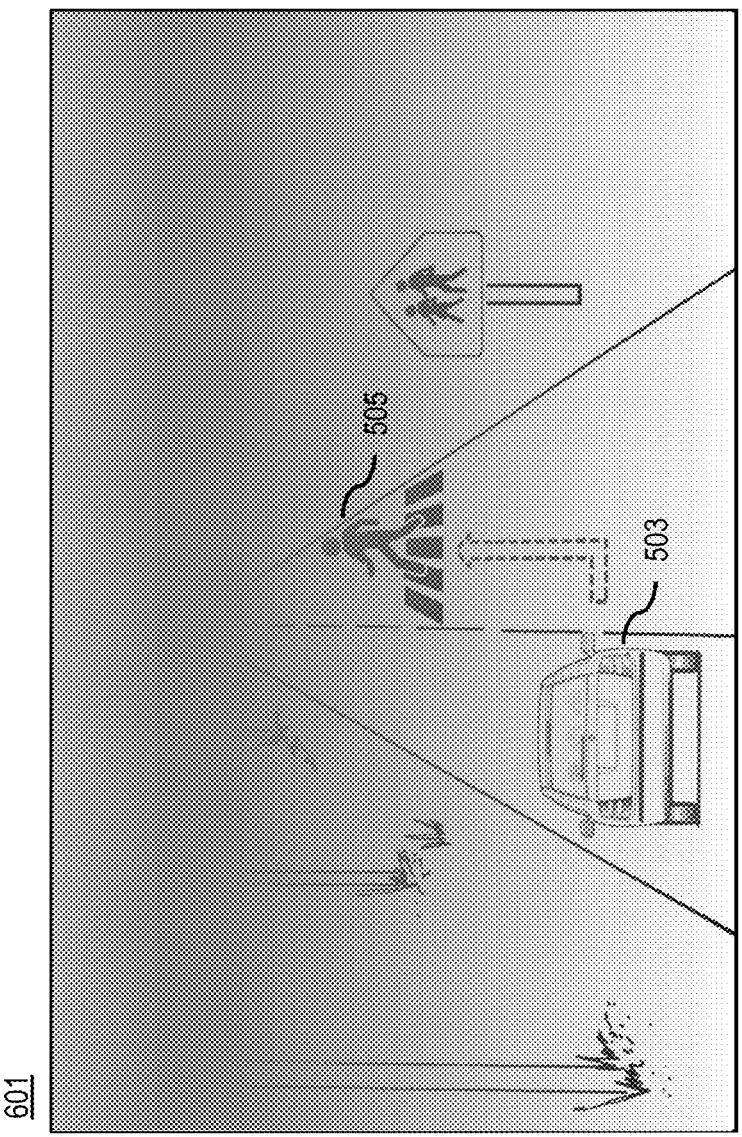
FIG. 6 is a diagram illustrating the rendering of the synthetic image data under different selectable or randomizable conditions, according to one embodiment.

FIG. 6 is a diagram illustrating the rendering of the synthetic image data under different selectable or randomizable conditions, according to one embodiment. In the example of FIG. 6, the weather condition for the action or situation depicted in the video clip 501 of FIG. 5 has been randomized to show foggy conditions. Accordingly, under the variation of the action shown in the FIG. 6, the image generator 203 simulates the same dangerous overtaking and potential collision of FIG. 5 but a rendering of foggy conditions in the video clip 601. In this way, the image generator can generate multiple instances or clips of a same or similar action under any number of different scenarios.

In one embodiment, the image generator 203 varies a level of detail or an abstractness of a rendering of the one or more objects, the geographic space, or other objects in the computer-generated image sequence based on a target generalizability of the machine learning model, and/or available computing resources. In other words, the image generator 203 can vary the realism of the computer-generated video or image sequence depending on the feature that is to be predicted. In the various embodiment described herein the synthetic image data is being generated for a machine learning system 103 to predict actions or movements. Accordingly, in some embodiments, the image generator 203 need not render at least some of the objects and/or the scenes in which the action or movement occurs using photo-realistic rendering (e.g., which is more computationally expensive). For example, instead of rendering a photorealistic representation of a pedestrian or object moving across a vehicle's path, a more abstract representation can be used (e.g., a silhouette, a block, a simple shape, etc.). In this way, the machine learning system 103 can be trained on the action or movement made by the object rather than on the specific appearance of the object making the movement. The simpler rendering also advantageously reduces the computer resources needed to generate the synthetic image data. However, in cases where the visual appearance of the object performing the selected action is important, then a more realistic rendering can be used.

Figure 7:
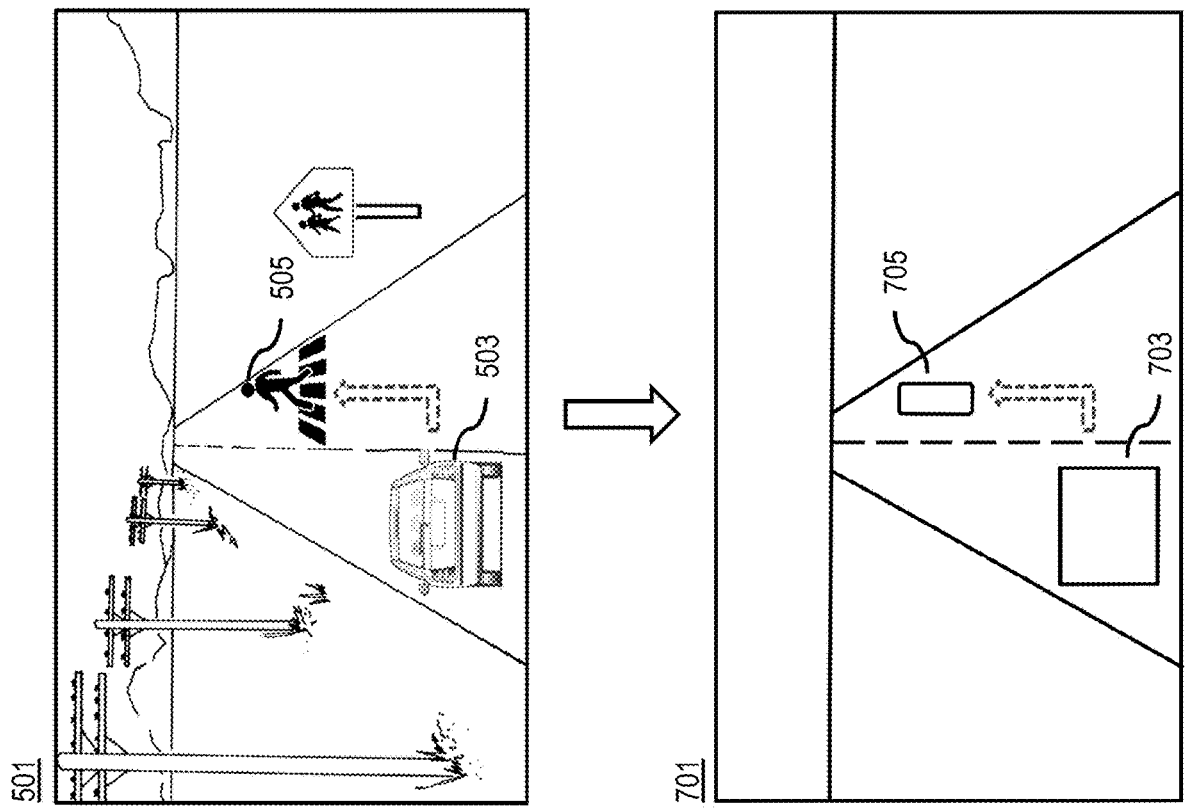
FIG. 7 is a diagram illustrating the rendering of the synthetic image data with different abstractions to increase the generalizability of a machine learning model, according to one embodiment.

FIG. 7 is a diagram illustrating the rendering of the synthetic image data with different abstractions to increase the generalizability of a machine learning model, according to one embodiment. In the example of FIG. 7, the image generator 203 abstracts the dangerous overtaking and potential collision scenario as depicted in the video clip 501 of FIG. 5 to generate an abstracted video clip 701. In the abstracted video clip 701, the image generator 203 renders only a simple horizon line without any background objects (e.g., telephone poles and mountains). In addition, instead of rendering realistic 3D representations of the vehicle 503 and pedestrian 505, the image generator renders them as simple geographic shapes (e.g., a square 703 to represent the vehicle 503, and a rounded rectangle 705 to represent the pedestrian 505).

In step 305, after generating the image sequence or video in the synthetic image data, the labeling module 205 automatically labels the synthetic image data with at least one label representing the at least one action, the set of parameters, or a combination thereof. In one embodiment, the labeled synthetic image can be stored in a training database 111 or equivalent. Because the synthetic image data is generated by the synthetic data platform 107 based on specified parameters, the platform 107 already has information to precisely label the computer-generated image sequence or video without any manual effort. In this way, the synthetic data platform 107 advantageously eliminates or reduces the manual or human resources that traditional approaches to annotating or labeling machine learning datasets entail. Moreover, by eliminating the manual labeling, the synthetic data platform 107 also advantageously reduces human error of inconsistency resulting from a subjective interpretation by the human labelling the action. In one embodiment, the image generator 203 has data indicating the precise frames or images in the image sequence that correspond to the action or movement requested by a user through its simulation and rendering of the scene. In this way, the image generator 203 can interact with the labeling module 205 to define labels to represent the designated action and/or parameters and then associated the labels with one or more frames of the computer-generated video.

Figure 8:
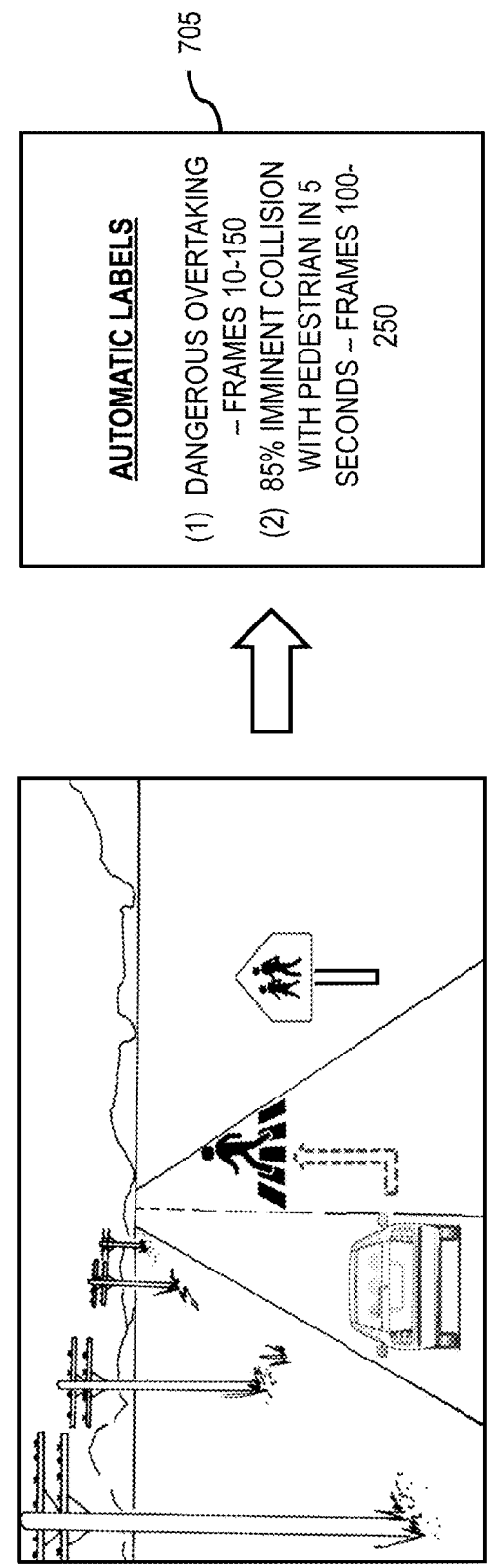
FIG. 8 is a diagram illustrating an example of automatically labeling synthetic image data, according to one embodiment.

For example, if a user requests that the synthetic data platform 107 create a computer-generated video depicting a dangerous overtaking maneuver and potential collision as in the example of FIG. 5 above as shown in FIG. 8. The labeling module 205 can automatically label the video to indicate which frames of the video were generated to show the maneuver. In one embodiment, the labeling of the synthetic image data comprises labeling a span of frames of the computer-generated image sequence as a positive case or a negative case of the at least one action, or labeling the span of frames with a variable parameter value associated with the at least one action (e.g., 85% probability of a collision). In the example of FIG. 8, the labeling module 205 automatically labels the video clip 501 to with two labels: (1) a first label to indicate dangerous overtaking is associated with frames 10-150 of the video clip 501; and (2) a second label to indicate that there is an 85% probability of an imminent collision with a pedestrian within 5 seconds is associated with frames 100-250 of the video clip 501. It is noted that the example for FIG. 8 presents the labels in human readable form, but in one embodiment, the labels generally would be represented numerically and provide as indexed binary data.

In one embodiment, the labeling module 205 can use the rendering or physics engine used to simulate the action to predict further potential scenarios our outcomes that may result from the simulation action even if the potential scenarios or outcomes are not be rendered or depicted in the computer-generated video. In other words, as the trajectories of the different objects are planned by a simulation after taking in the different parameters, the simulation can determine if the objects in the 3D scene will collide or potentially collide at any point, without having to render the 3D scene in detail. This, in turn, provides an indication for automatically labeling the computer-generated video clip as positive/negative for containing a collision or potential collision. A frame or image sequence can then be labeled as positive if a collision is to happen in <=x seconds from the action depicted in the sequence. For example, the labeling module 205 can determine that the at least one action will result in a collision, a near miss, a potential collision, or a combination thereof between the one or more objects within a time threshold. The labeling module 205 can then label the synthetic image data to further indicate the collision, the near miss, the potential collision, or a combination thereof.

It is contemplated that the possible identifiable situations are not limited to collisions or potential collisions, but to any situation or outcome that can be inferred by analyzing a time instance before the situation happens. Using embodiments of this inference capability, multiple variations of a situation or action at any given location can be generated in a simpler manner. In this way, the training set can advantageously grow with a high variety and with an almost unlimited amount of samples, which is not possible using actual video samples.

After automatically labeling the synthetic image data (e.g., as either positive or negative cases) of a certain situation, they can be exported. For example, in step 307, the data delivery module 207 provides the labeled synthetic image data for training or evaluating a machine learning model to detect the at least one action. In one embodiment, the set of parameters provided by the user can include a dataset parameter for describing a technical property of the synthetic image data that is to be used for providing the synthetic image data. By way of example, the technical property includes a perspective, a frame size, a frame rate, a resolution, an image sequence length, a format or codec, a delivery option, or a combination thereof of the labeled synthetic image data.

In one embodiment, the labeled synthetic image data can be provided as a download, as a data stream, via a physical media, or a combination thereof continuously or by a batch process. Accordingly, a user can choose to obtain the dataset from the data delivery module 207 either per: download; physical media (e.g., CD/DVD/Blu-ray Disc, HDD, SSD, SD card, USB memory device etc.); streamed; and/or the like. For example, streaming of labeled synthetic image data offers the possibility to provide an essentially infinite stream of image variations for actions simulated for a specific geographic region/route. In one embodiment, the data delivery module 207 use access credentials, metering, and/or equivalent to enable users to access the synthetic data platform 107 and, in some cases, to charge the user for the synthetic data service. A client application (e.g., a client application 113 executing on a user device 115) may connect to the service via a web link (e.g., a URL) to access the synthetic image data stream. Alternatively, the data delivery module 207 can push the labeled synthetic image dataset to a pre-defined web address (e.g., a client URL). In this way, CNN or other machine learning detectors can advantageously constantly train and improve their detections if permanently plugged into the synthetic data platform 107's streaming or other data delivery service.

In addition to providing labeled synthetic image data as a service, the data delivery module 207 can provide the data as a product. For example, the resulting set of labeled synthetic image sequences from the synthetic data platform 107 can be delivered as a bulk package for download, on media or offered for download, as described above. In yet another embodiment, the synthetic data platform 107 itself can be a product that is integrated into other third-party services and/or content providers. For example, the synthetic data platform 107 (as a product) can be incorporated into a third-party services platform 117, any of the services 119a-119n (also collectively referred to as services 119) of the services platform 117, the content providers 121a-121m (also collectively referred to as content providers 121), and/or equivalent.

In one embodiment, the synthetic data platform 107 can generate labeled synthetic image datasets as service for training models to safely navigate vehicles in planned routes. For example, routes planned in advance typically cover specific areas of the map. While there are many variables on a route, the route geometry and buildings are rather constant. Accordingly, a labeled synthetic image training set could be generated according to the various embodiments described herein to include all of the more permanent elements of a route while randomizing features such as road quality, road paint, other vehicles, pedestrians, cyclist, advertisement posters, etc. A CNN or other machine learning detector mounted on a vehicle 101 could receive the synthetic image dataset prior to driving the route, which would enable the dataset to further train the machine learning detector of the vehicle 101 for the specifics of a route, thereby advantageously increasing accuracy and safety significantly.

Figure 9:
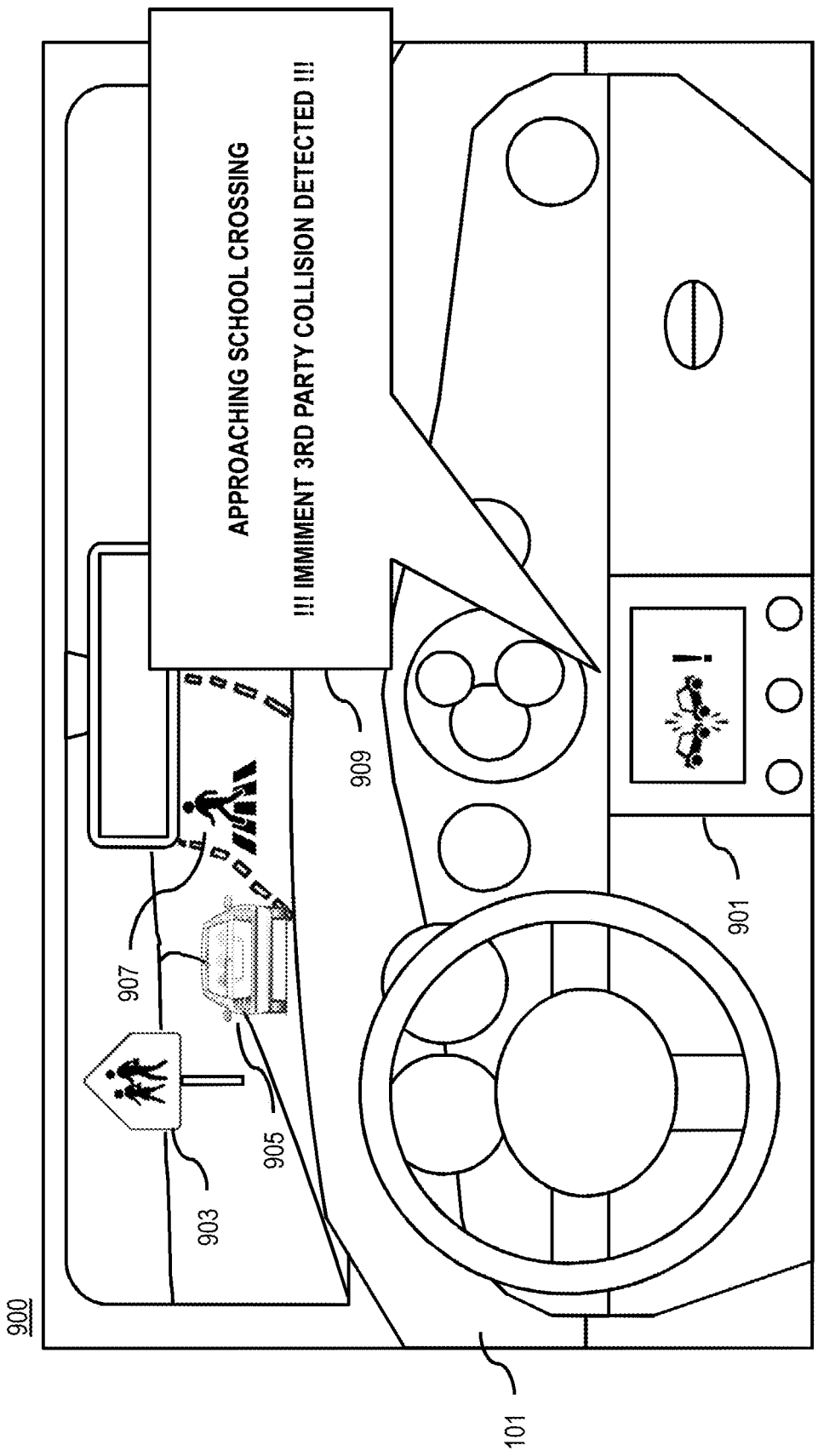
FIG. 9 is a diagram illustrating an example user interface of a CNN detector trained to detect potential collisions using synthetic image data, according to one embodiment.

FIG. 9 is a diagram illustrating an example user interface 900 of a CNN detector trained to detect potential collisions using synthetic image data, according to one embodiment. In this example, the vehicle 101 is equipped with a system 901 including a CNN detector for detecting potential collisions. Although not depicted FIG. 9, in some embodiments, the system 901 and/or CNN detector can comprise an application 113 executing on a user device 115 (e.g., a mobile phone) that can be mounted in the vehicle 101 or held by a user. In the example of FIG. 9, synthetic image data such as the video clip 501 of FIG. 5 is streamed or otherwise delivered to train and or evaluate the CNN detector subsequently placed in the vehicle 101. Based on this training, when the vehicle 101 approaches a school crossing zone 903 at which a vehicle 905 is making a dangerous maneuver that might result in a collision with a pedestrian 907. The vehicle 101 captures a video clip of the scene which is processed by the onboard CNN detector, resulting in a prediction of an imminent collision between the vehicle 905 and pedestrian 907. The system 901 can then warn the driver of the imminent third-party collision in an alert message 909. Alternatively, if the vehicle 101 is an autonomous vehicle operating in autonomous mode, the system 901 can interact with the vehicle control system to automatically modify the vehicle 101's operation to avoid the upcoming collision (e.g., changing direction, slowing down, or honking to alert the other vehicle 905 and/or pedestrian 907).

In summary, allowing users of this synthetic data platform 107 to choose or describe the labeled action (e.g., dynamic movements and potentially other behaviors) by selected objects along with parameters such as camera point-of-view/position and additional variability (like environmental variables), provides the potential to learn and predict complex behaviors for autonomous driving and other applications beyond the automotive scenario. These other applications include, but are not limited to: (1) alerting pedestrians when it is unsafe to cross the road; (2) alerting bicyclists t seconds before potential collisions; (3) street cameras capturing motorcycles dangerous in-lane bypassing; etc.

Returning to FIG. 1, as shown and discussed above, the system 100 includes the synthetic data platform 107 for providing labeled synthetic image data for training machine learning models (e.g., a CNN) of the machine learning system 103. In some use cases, the system 100 can include a computer vision system 105 configured to use machine learning to detect actions or dynamic movement of objects depicted in image sequences or videos. For example, with respect to driving, navigation, mapping, and/or other similar applications, the computer vision system 105 can detect collisions, dangerous situations (e.g., dangerous overtaking, following too closely, dangerous weaving, etc.) in input image sequences and generate associated prediction confidence values, according to the various embodiments described herein. In one embodiment, the machine learning system 103 includes a neural network or other machine learning models to make predictions of detected actions and related features. In one embodiment, the neural network of the machine learning system 103 is a CNN which consists of multiple layers of collections of one or more neurons (which are configured to process a portion of an input image such as a grid cell or receptive field). In one embodiment, the receptive fields of these collections of neurons (e.g., a receptive layer) can be configured to correspond to the area of an input image delineated by a respective a grid cell generated as described above.

In one embodiment, the synthetic data platform 107 has connectivity or access to a training database 111 for storing the labeled synthetic image data generated according to the various embodiments described herein, and as well as a geographic database 109 for retrieving mapping data and/or related attributes for creating computer-generated videos of user-specified actions. In one embodiment, the geographic database 109 can include electronic or digital representations of mapped geographic features to facilitate generating of synthetic image data. In one embodiment, the synthetic data platform 107, machine learning system 103 and/or computer vision system 105 have connectivity over a communication network 116 to the services platform 117 that provides one or more services 119. By way of example, the services 119 may be third-party services that rely on machine learning models trained using synthetic image data. By way of example, the services 119 include, but are not limited to, mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 119 uses the output of the synthetic data platform 107, machine learning system 103 and/or of the computer vision system 105 employing labeled synthetic image data for machine learning.

In one embodiment, the synthetic data platform 107, machine learning system 103, and/or computer vision system 105 may be platforms with multiple interconnected components. The synthetic data platform 107, machine learning system 103, and/or computer vision system 105 may include multiple servers, intelligent networking devices, computing devices, components and corresponding software for generating labeled synthetic image data for machine learning. In addition, it is noted that the synthetic data platform 107, machine learning system 103, and/or computer vision system 105 may be separate entities of the system 100, a part of the one or more services 119, a part of the services platform 117, or included within the user devices 115 and/or vehicle 101.

In one embodiment, content providers 121 may provide content or data (e.g., including geographic data, 3D models, parametric representations of mapped features, etc.) to the synthetic data platform 107, the machine learning system 103, the computer vision system 105, the services platform 117, the services 119, the user devices 115, the vehicle 101, and/or an application 113 executing on the user device 115. The content provided may be any type of content, such as map content, textual content, audio content, video content, image content, etc. used for generating labeled synthetic image data. In one embodiment, the content providers 121 may provide content that may also aid in generating synthetic image data. In one embodiment, the content providers 121 may also store content associated with the synthetic data platform 107, geographic database 109, machine learning system 103, computer vision system 105, services platform 117, services 119, user device 115, and/or vehicle 101. In another embodiment, the content providers 121 may manage access to a central repository of data, and offer a consistent, standard interface to data, such as a repository of the geographic database 109.

In one embodiment, the user device 115 and/or vehicle 101 may execute a software application 113 to capture image data or other observation data for processing by the redundant feature detection engine according the embodiments described herein. By way of example, the application 113 may also be any type of application that is executable on the user device 115 and/or vehicle 101, such as autonomous driving applications, mapping applications, location-based service applications, navigation applications, content provisioning services, camera/imaging application, media player applications, social networking applications, calendar applications, and the like. In one embodiment, the application 113 may act as a client for the machine learning system 103 and/or computer vision system 105 and perform one or more functions associated with providing a redundant feature detection engine alone or in combination with the machine learning system 103.

By way of example, the user device 115 is any type of computer system, embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the user device 115 can support any type of interface to the user (such as "wearable" circuitry, etc.). In one embodiment, the user device 115 may be associated with the vehicle 101 or be a component part of the vehicle 101.

In one optional embodiment, the user device 115 and/or vehicle 101 are configured with various sensors for generating or collecting environmental image data (e.g., for processing by the machine learning system 103 and/or computer vision system 105), related geographic data, etc. In one embodiment, the sensed data represent sensor data associated with a geographic location or coordinates at which the sensor data was collected. In this way, the sensor data can act as observation data that can be process by the machine learning system 103 that has been trained and/or evaluated using the synthetic image data generated by the synthetic data platform 107. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of optional sensors of the user device 115 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the user device 115 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the user device 115 and/or vehicle 101 may include GPS or other satellite-based receivers to obtain geographic coordinates or signal for determine the coordinates from satellites 123. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In another optional embodiment, the communication network 116 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the synthetic data platform 107, machine learning system 103, computer vision system 105, services platform 117, services 119, user device 115, vehicle 101, and/or content providers 121 optionally communicate with each other and other components of the system 100 using well known, new or still developing protocols. In this context, a protocol includes a set of rules defining how the network nodes within the communication network 116 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
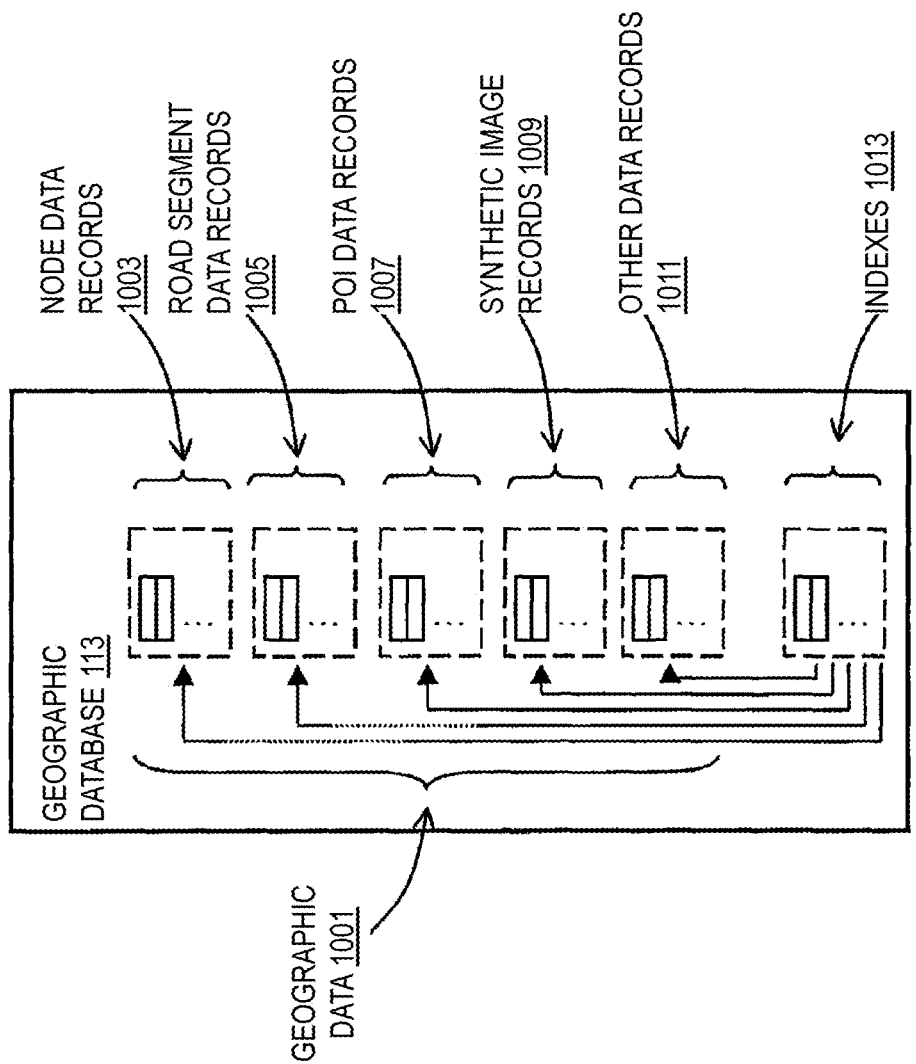
FIG. 10 is a diagram of a geographic database, according to one embodiment.

FIG. 10 is a diagram of a geographic database, according to one embodiment. In one embodiment, the geographic database 109 includes geographic data 1001 used for (or configured to be compiled to be used for) mapping and/or navigation-related services, such as for video odometry based on the parametric representation of signs include, e.g., encoding and/or decoding parametric representations into object models of signs. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature.

In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1003, road segment or link data records 1005, POI data records 1007, synthetic image data records 1009, other records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 109. In one embodiment, the indexes 1013 may be used to quickly locate data without having to search every row in the geographic database 109 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1007. The geographic database 109 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 109 can also include synthetic image records 1009 for storing labeled synthetic image data (e.g., as an alternate or in addition to storage in the training database 111, data used for generating the labeled synthetic image data, and or any related data. In one embodiment, the synthetic image data records 1009 can be associated with one or more of the node records 1003, road segment records 1005, and/or POI data records 1007 to associate the synthetic image data with specific geographic locations. In this way, the labeled synthetic image data can also be associated with the characteristics or metadata of the corresponding record 1003, 1005, and/or 1007.

In one embodiment, the geographic database 109 can be maintained by the content provider 121 in association with the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle (e.g., vehicle 101 and/or user device 115) along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or user device 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for generating labeled synthetic image data for machine learning may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
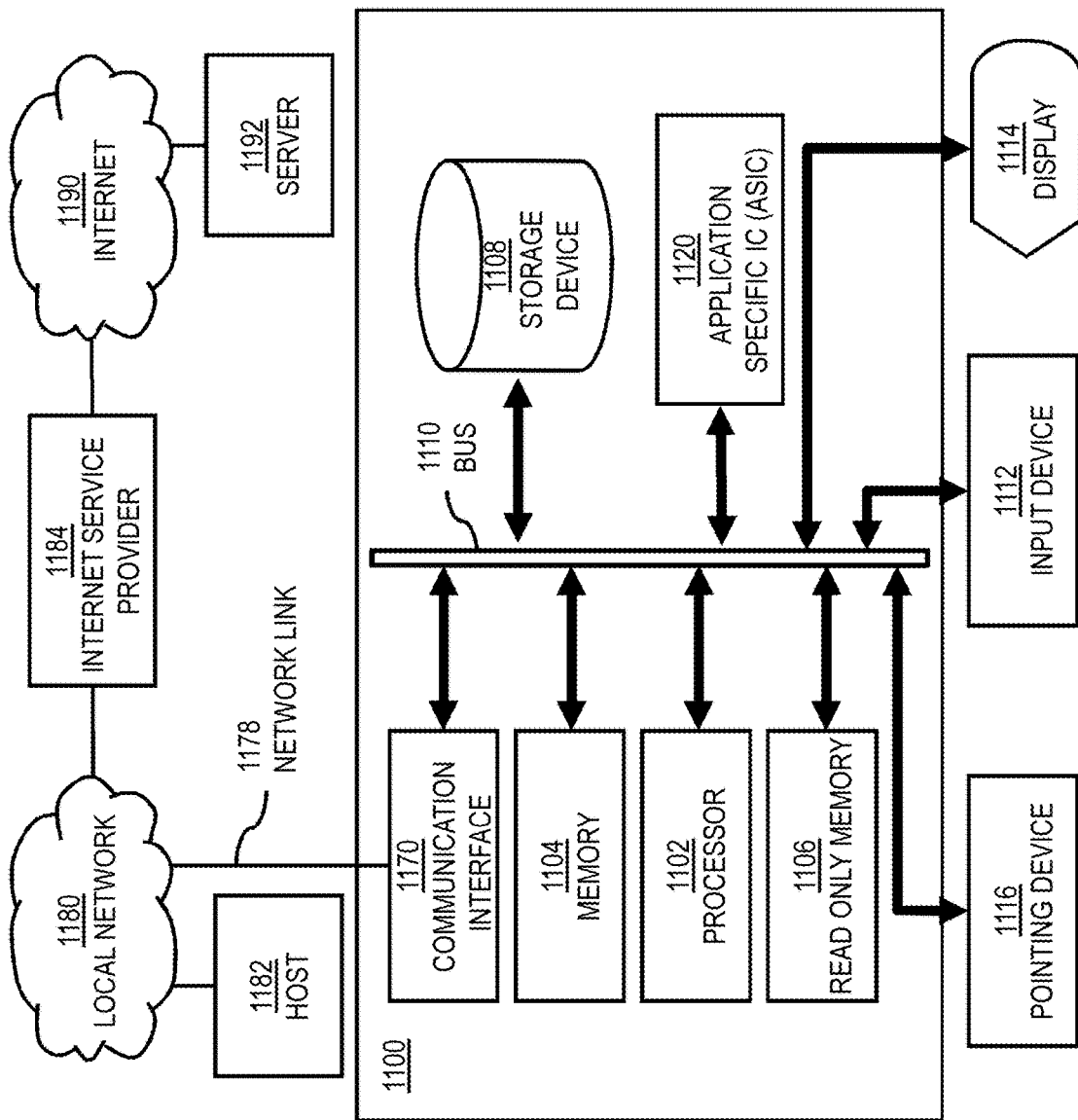
FIG. 11 is a diagram of hardware that can be used to implement an embodiment of the invention.

FIG. 11 illustrates a computer system 1100 upon which an embodiment of the invention may be implemented. Computer system 1100 is programmed (e.g., via computer program code or instructions) to generate labeled synthetic image data for machine learning as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to generating labeled synthetic image data for machine learning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for generating labeled synthetic image data for machine learning. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for generating labeled synthetic image data for machine learning, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 116 for generating labeled synthetic image data for machine learning.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to generate labeled synthetic image data for machine learning as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to generate labeled synthetic image data for machine learning. The memory 1205 also stores the data associated with or generated by the execution of the inventive steps.

Figure 13:
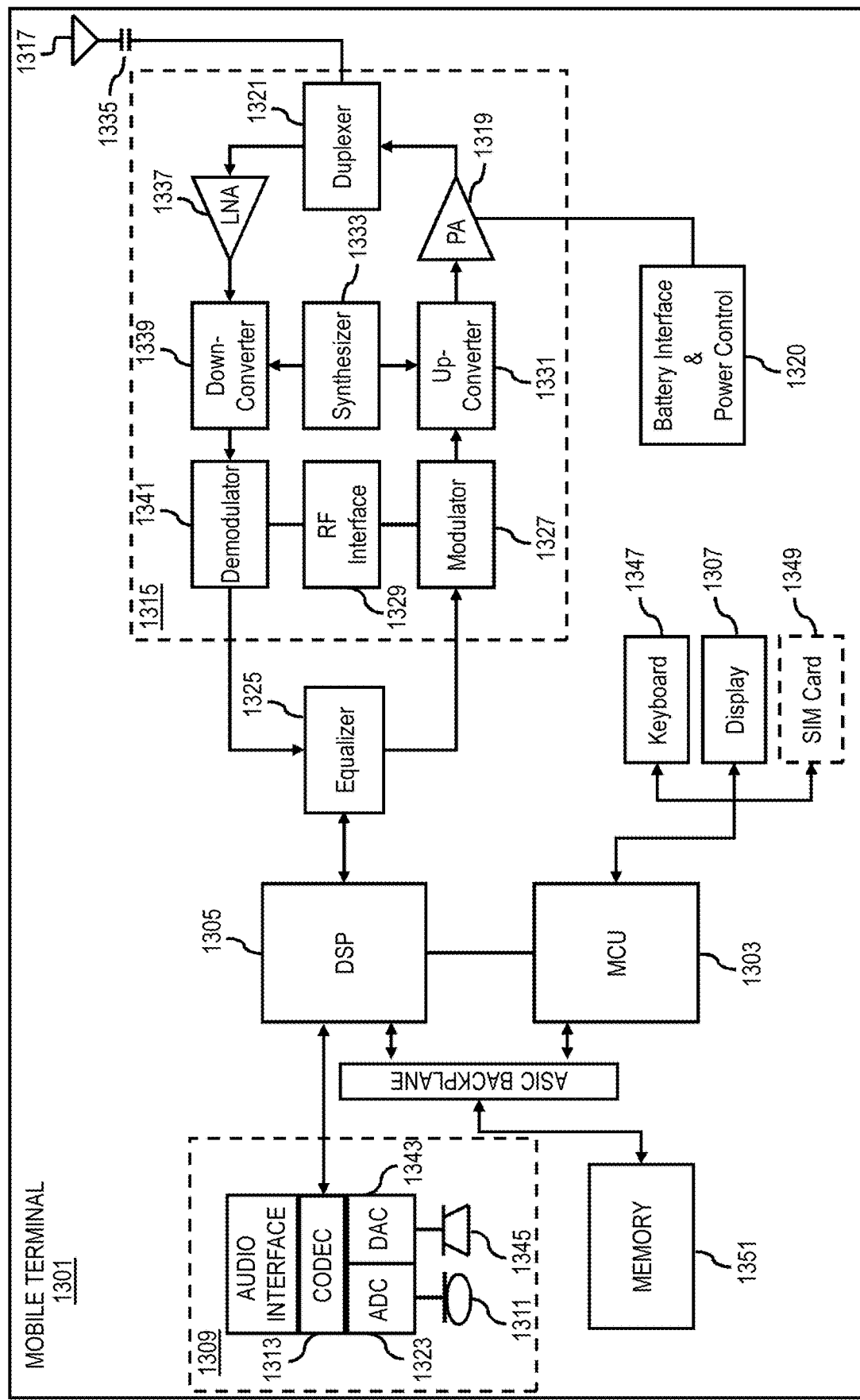
FIG. 13 is a diagram of a mobile terminal (e.g., handset) that can be used to implement an embodiment of the invention.

FIG. 13 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to generate labeled synthetic image data for machine learning. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   determining, by a processor, a set of parameters for indicating at least one action by one or more objects, wherein the at least one action is a dynamic movement of the one or more objects through a geographic space over a period of time, and the set of parameters is user defined, wherein the set of parameters includes an action parameter describing a type of the at least one action, and wherein the type of the at least one action includes failing to drive at a safe distance, driving above the speed limit, failing to yield, running a red light, driving in the wrong direction, driving while impaired, an imminent collision, an accident, a pedestrian or animal about to cross, unsafe or dangerous overtaking, dangerous driving behavior, or a combination thereof;
   processing the set of parameters to generate synthetic image data, wherein the synthetic image data includes a computer-generated image sequence of the one or more objects performing the at least one action in the geographic space over the period of time;
   automatically labeling the synthetic image data with at least one label representing the at least one action, the set of parameters, or a combination thereof; and
   providing the labeled synthetic image data for training or evaluating a machine learning model to detect the at least one action.

2. The method of claim 1, wherein the at least one action is related to an automotive scenario, and the one or more objects include a vehicle, a pedestrian, a cyclist, an animal, a road, road debris, a road object, or a combination thereof.

3. A computer-implemented method comprising:
   determining, by a processor, a set of parameters for indicating at least one action by one or more objects, wherein the at least one action is a dynamic movement of the one or more objects through a geographic space over a period of time, and the set of parameters is user defined;
   processing the set of parameters to generate synthetic image data, wherein the synthetic image data includes a computer-generated image sequence of the one or more objects performing the at least one action in the geographic space over the period of time;
   automatically labeling the synthetic image data with at least one label representing the at least one action, the set of parameters, or a combination thereof;
   providing the labeled synthetic image data for training or evaluating a machine learning model to detect the at least one action;
   determining that the at least one action will result in a collision, a near miss, a potential collision, a hazardous driving behavior, or a combination thereof between the one or more objects within a time threshold; and
   labeling the synthetic image data to further indicate the collision, the near miss, the potential collision, the hazardous driving behavior, or a combination thereof.

4. The method of claim 1, wherein the labeling of the synthetic image data comprises labeling a span of frames of the computer-generated image sequence as a positive case or a negative case of the at least one action, or labeling the span of frames with a variable parameter value associated with the at least one action.

5. The method of claim 1, wherein the labeled synthetic image data is provided as a download, as a data stream, via a physical media, or a combination thereof continuously or by a batch process.

6. The method of claim 1, further comprising:
   determining one or more randomizable rendering variables associated with the computer-generated image sequence; and
   randomizing the one or more randomizable rendering variables to generate the synthetic image data.

7. The method of claim 1, wherein the set of parameters includes an environmental parameter describing the geographic space, an object parameter describing a type of the one or more objects, or a combination thereof.

8. The method of claim 1, further comprising:
   querying a geographic database for map data associated with the geographic space; and
   rendering the geographic space in the computer-generated image sequence based on the map data.

9. The method of claim 1, further comprising:
   selecting the geographic space based on an area of interest, an origin-destination pair, a navigation route, a road geometry, an accident rate, or a combination thereof.

10. The method of claim 1, wherein the set of parameters includes a dataset parameter for describing a technical property of the synthetic image data, and wherein the technical property includes a perspective, a frame size, a frame rate, a resolution, an image sequence length, a format or codec, a delivery option, or a combination thereof of the labeled synthetic image data.

11. The method of claim 1, further comprising:
varying a level of detail or an abstractness of a rendering of the one or more objects, the geographic space, or other objects in the computer-generated image sequence based on a target generalizability of the machine learning model.

12. The method of claim 1, further comprising:
determining one or more background objects to render in the computer-generated image sequence based on the geographic space.

13. An apparatus comprising:
at least one processor; and
at least one memory including computer program code for one or more programs,
the at least one memory and the computer program code configured to, with the at least one processor, cause the apparatus to perform at least the following,
process a set of parameters indicating at least one action by one or more objects to generate synthetic image data, wherein the synthetic image data includes a computer-generated image sequence of the one or more objects performing the at least one action in a geographic space over a period of time, and the set of parameters is user defined, wherein the set of parameters includes an action parameter describing a type of the at least one action, and wherein the type of the at least one action includes failing to drive at a safe distance, driving above the speed limit, failing to yield, running a red light, driving in the wrong direction, driving while impaired, an imminent collision, an accident, a pedestrian or animal about to cross, unsafe or dangerous overtaking, dangerous driving behavior, or a combination thereof;
automatically label the synthetic image data with at least one label representing the at least one action, the set of parameters, or a combination thereof; and
provide the labeled synthetic image data for training or evaluating a machine learning model to detect the at least one action.

14. The apparatus of claim 13, wherein the at least one action is related to an automotive scenario, and the one or more objects include a vehicle, a pedestrian, a cyclist, an animal, a road, road debris, a road object, or a combination thereof.

15. The apparatus of claim 13, wherein the apparatus is further caused to:
determine that the at least one action will result in a collision between the one or more objects within a time threshold; and
label the synthetic image data to further indicate the collision.

16. The apparatus of claim 13, wherein the labeling of the synthetic image data causes the apparatus to label each frame of the computer-generated generated image sequence as a positive case or a negative case of the at least one action, or to label said each frame with a variable parameter value associated with the at least one action.

17. A non-transitory computer-readable storage medium, carrying one or more sequences of one or more instructions which, when executed by one or more processors, cause an apparatus to perform:
processing a set of parameters indicating at least one action by one or more objects to generate synthetic image data, wherein the synthetic image data includes a computer-generated image sequence of the one or more objects performing the at least one action in a geographic space over a period of time, and the set of parameters is user defined, wherein the set of parameters includes an action parameter describing a type of the at least one action, and wherein the type of the at least one action includes failing to drive at a safe distance, driving above the speed limit, failing to yield, running a red light, driving in the wrong direction, driving while impaired, an imminent collision, an accident, a pedestrian or animal about to cross, unsafe or dangerous overtaking, dangerous driving behavior, or a combination thereof;
automatically labeling the synthetic image data with at least one label representing the at least one action, the set of parameters, or a combination thereof; and
providing the labeled synthetic image data for training or evaluating a machine learning model to detect the at least one action.

18. The non-transitory computer-readable storage medium of claim 17, wherein the at least one action is related to an automotive scenario, and the one or more objects include a vehicle, a pedestrian, a cyclist, an animal, road debris, a road object, or a combination thereof.

19. The non-transitory computer-readable storage medium of claim 17, wherein the set of parameters includes a dataset parameter for describing a user-defined property of the synthetic image data, and wherein the user-defined property includes a perspective, a frame size, a frame rate, a resolution, an image sequence length, a format or codec, a delivery option, or a combination thereof of the labeled synthetic image data.

\* \* \* \* \*